Sept. 8, 1942.     W. I. BENDZ     2,295,327
LOOP CONTROL SYSTEM
Filed April 13, 1939
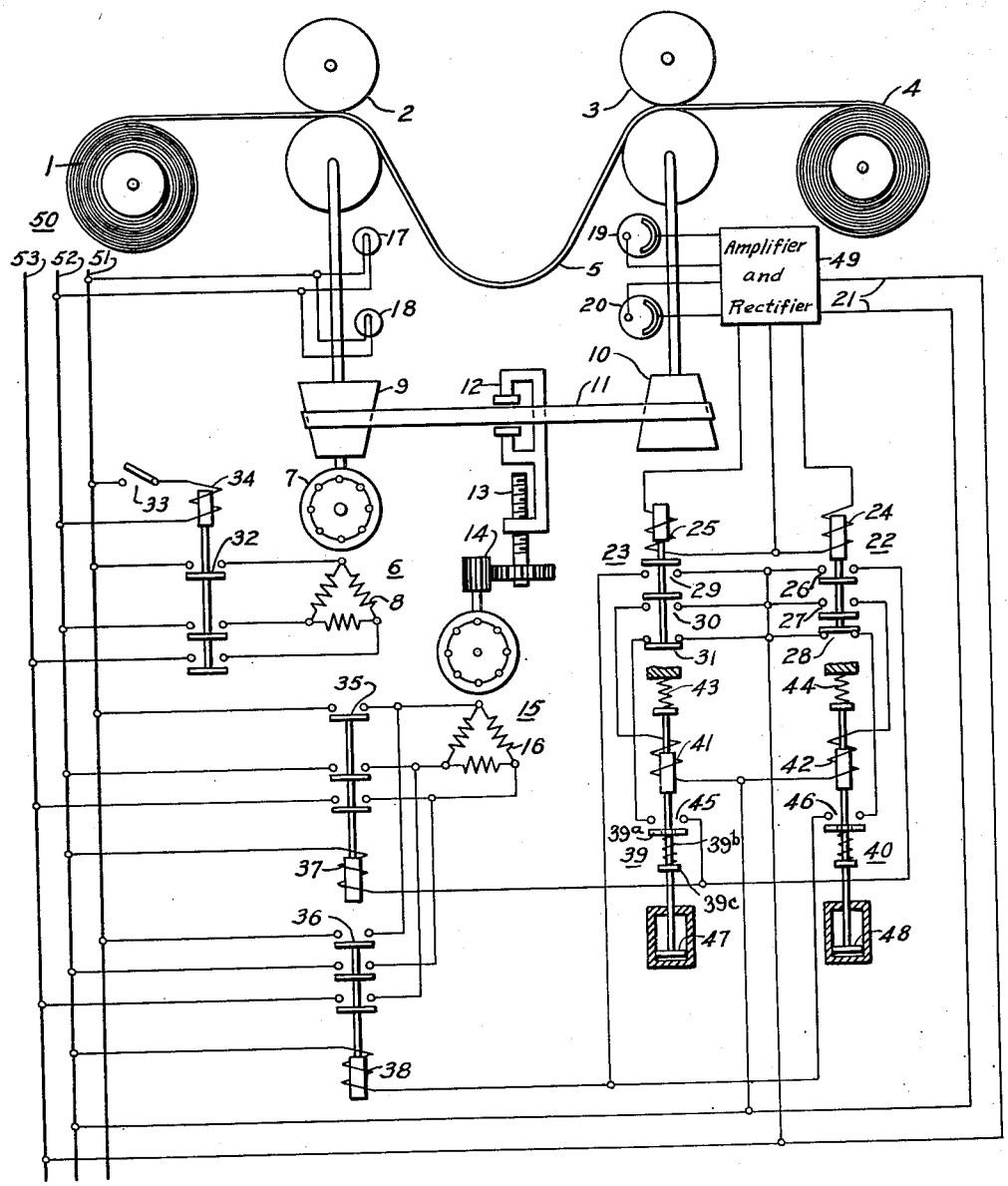
WITNESSES:
INVENTOR
Waldemar I. Bendz.
BY
ATTORNEY Patented Sept. 8, 1942

2,295,327

UNITED STATES PATENT OFFICE 2,295,327

LOOP CONTROL SYSTEM

Waldemar I. Bendz, Arlington, Mass., assignor to Westinghouse Electric & Manufacturing Company, East Pittsburgh, Pa., a corporation of Pennsylvania Application April 13, 1939, Serial No. 267,586

10 Claims. (Cl. 271—2.3)

My invention relates to a loop control system for a winding machine for maintaining a substantially constant length of a loop of paper, rubber or other similar material.

There are certain processes in which flexible material such as paper, rubber or thin metal must pass from one section of a machine to another section and yet not be under tension. For such applications it is necessary to allow the material to form a loose, usually depending, loop between the supply roll of one section and the intake roll of the immediately following section.

There are two ways in which the coordinated sections of the machine may be driven. One method is by driving each section by independent means, or motors. Both such means, or motors, must be matched in speed to maintain the loop with a constant amount of slack. Another method is to employ only one driving means for both sections in which case one section is coupled to the shaft of the motor through suitable reduction gearing or a belt and the other section is driven through some form of mechanical or electrical variable speed transmission.

My invention relates to the second method of drive and particularly refers to the so called double cone type of variable speed drive of which the "Reeves drive" is typical.

Systems employing means responsive to the amount of slack in the loop to control the ratio of the variable speed transmission are known in the art. The means responsive to the amount of slack in the loop can be either contact making levices actually operated by the material itself or they may be photo-electric devices arranged so that the material intercepts beams of light located as desired. Briefly stated, if the loop becomes too high or too low, the speed controlling member of the variable speed transmission is shifted in the proper direction to alter the speed of one section with respect to the other so as to take up or pay out more slack to the loop as may be required.

It is immediately obvious that such a scheme of control requires the introduction of some sort of anti-hunting means in order to prevent continual hunting of the variable speed transmission between the "fast" and "slow" limit of its ratio.

In the past there has been employed anti-hunting means based on a time delay principle of operation. The most common arrangement has been to interpose a time delay "step-by-step" type of relay between the device responsive to the position of the loop and the device controlling the ratio of the variable speed transmission. The function of such a scheme is to start making a change in speed as soon as the loop gets out of position but to restrict the movement of the speed controlling member to only a small part of its total range for a given time interval. During this interval of inaction the position of the loop may have been corrected sufficiently to make any further change in the variable speed transmission unnecessary. However, if the loop has not been corrected, the speed control member is allowed to take another "step" and so on until the desired correction has been made.

A system such as briefly described above has two disadvantages. First, it will hunt considerably even under the most favorable conditions because of the fundamental fact that the anti-hunting force is applied for a constant interval of time and it does not vary with the degree of correction necessary. The fundamental requirement of any successful anti-hunting scheme is that the anti-hunting force vary directly with the degree of correction necessary. Second, it is possible for the system to go entirely out of control if the rate of correction necessary to hold the loop in position exceeds the average rate at which the anti-hunting relay will allow the speed control member to operate.

An object of my invention is to provide a loop control system in which the anti-hunting force varies directly with the degree of correction necessary.

Another object of my invention is to provide a loop control system which is simple, inexpensive but very reliable in operation.

Other objects and advantages will become more apparent from a study of the following specification when considered in conjunction with the accompanying drawing.

A system embodying my invention and illustrated in the drawing comprises a supply roll for supplying flexible material 1. This material passes through rolls 2 and then on to rolls 3 and finally to a take-up roll 4. Rolls 1 and 2 comprise another section either of the same machine or an adjacent machine. The function to be accomplished is to match the speed of rolls 2 to the speed of rolls 3 so as to hold the length of the loop 5 within desired usually narrow limits of variation.

Rolls 2 are driven directly from the rotor 7 of motor 6 and therefore this section of the machine represents the constant speed section. Rolls 3 are driven by motor 7 through the variable speed transmission consisting of cone pulleys 9 and 10, the connecting belt 11 and the device 12 for shifting the position of the belt along the cone pulleys 9 and 10. Therefore, rolls 3 and 4 represent the variable speed section of the machine, the linear speed of the strip material of which relative to that of the constant speed section is controlled by the position of belt shifting device 12.

The belt shifting device 12 is controlled by a screw 13 which is in turn driven by gearing 14 from a reversible motor 15. The reversing contact members 35 and 36 of relays 37 and 38 allow, respectively, energization of the stator 16 of the motor 15, thereby causing it to rotate clockwise or counter-clockwise to shift the belt in one or the other direction by means of the belt shifting device 12.

A still better understanding of my invention may be had from a study of a typical sequence of operation.

The machine is started by closing switch 33 thereby energizing contactor coil 34. Contact members 32 then close to connect the stator 8 of the motor 6 by the supply lines 51, 52, and 53.

The device responsive to the position of the loop is shown to consist of photo-electric cells 19 and 20 together with corresponding light sources 17 and 18, respectively. A source of power fed through conductors 21 makes possible the operation of relay coils 24 and 25 of relays 22 and 23, respectively, when the light from sources 17 and 18 strikes the photo-electric cells 19 and 20, respectively. The source of power 21 is impressed on the necessary rectifier and amplifier tubes which are a standard part of any photo-electric device and are represented by numeral 49.

It should be understood that this disclosure would be equally valuable if the photo-electric cells were replaced by contact making devices which were directly operated by contact with the material in which case operation of relays 24 and 25 would be controlled by open and closed contact members made responsive to the position of the material forming the loop 5.

The basic principle of operation of this scheme depends upon the operation of two unusual time delay relays 39 and 40. For the purpose of description these relays are shown as simple dashpot type time delay relays whereas the device may also be electronic in operation.

Refer to time delay relay 39. When the coil 41 is energized, its contact members 45 are caused to immediately close by operation of the relay plunger since the bridging contact member 39a thereof is slidably and yieldably mounted on the stem of relay 39 by means of a spring 39b rigidly secured to by any suitable means (not shown) or supported at its lower end on lug 39c of the plunger as shown in the drawing. The plunger of the relay is then free to move an additional amount and will continue to move the piston 47 of the dashpot for as long an interval as the coil 41 may be kept energized. In other words, the longer the coil 41 is energized, the higher the piston of the dashpot will be moved. When the coil 41 is deenergized the compression spring 43 will push the piston of the dashpot in the return direction. During this return stroke of the piston the contact members 45 will be kept closed until the piston returns to the original position. Design constants of the device are such that the compression spring 43 will cause the piston to return to its original position slightly faster than the coil 41 causes the piston to advance. The purpose in this design is to cause the contact members 45 to be closed for a period of time following the instant at which the coil 41 becomes deenergized approximately equal but somewhat less than the interval of time for which the coil 41 was energized. Since the upward movement of the piston 47 is proportional to the interval for which the coil 41 is energized, it is obvious that the reset time of the piston is also proportional to this same interval. Thus the contact members 45 will be closed for an interval, following the deenergizing of the coil 41, slightly less than the interval for which the coil 41 was energized, therefore, the longer the coil 41 is kept energized, the longer the contacts 45 will remain closed after the coil is deenergized.

Briefly stated, the function of the scheme is that the belt 11 is moved in the proper direction, by the shifting device 12, to alter the speed depending upon the position of the loop 5. When the loop length has been corrected to within the desired limits, the belt shifting device 12 is immediately reversed and returns nearly to its original position. The function of the scheme in detail is as follows:

The normal position of the loop 5 is below the upper light beam between light source 17 and photo cell 19 but above the lower light beam between light source 18 and photo cell 20. If the loop is between these two limits of position, the control is incperative and no correction needs to be made.

Assume that the loop 5 is lengthened until the material intercepts the beam between light source 18 and photo cell 20. Relay coil 25 will then be deenergized allowing contact members 29 and 30 to close and contact members 31 to open. Contact members 29 will complete the circuit to contactor coil 38 from the supply lines 53 and 52. Contact members 36 will then close to permit energization of the stator 16 of motor 15 and operate the belt shifting device 12 in the proper direction to increase the speed of pulley 10 with reference to pulley 9. This correction will raise the position of the loop 5. In the meantime contact members 30 of relay 23 will complete a circuit to energize coil 41 of time delay relay 39 from supply lines 53 and 52. The contact members 45 will almost immediately close but since the contact members 31 of relay 23 are now in the open position, there is no flow of current through contact members 45.

After a given interval of time the loop 5 will have been raised a sufficient distance to allow the beam between light source 18 and photo cell 20 to be re-established, thereby again energizing the coil 25 of relay 23. The contact members 29 and 30 will then be opened and contact members 31 will close. Closing of contact members 31 will complete the circuit from line 53 to contact members 31, then through contact member 45 of time delay relay 39 to the coil of relay 37 and then to line 52. This circuit will energize the coil of relay 37 and close contact members 35. Contact members 35 of relay 37 will close a circuit to energize the stator 16 of motor 15 in the proper phase rotation to reverse the direction of rotation so as to drive belt shifting device 12 back toward its original position.

As previously described the operation of time delay relay 39 is such that the contact members 45 will remain closed for an interval of time nearly equal to the interval during which its coil was energized. In this manner the motor 15 is caused to rotate in the direction to operate the belt shifting device 12 to shift the belt back toward its original position and since it will be rotated nearly the same number of revolutions in the other direction, the belt will be returned nearly to the same position it occupied prior to making the correction. In actual practice the adjustment of the timing relay is made such that the interval of time required for piston 47 or 48 to assume the position shown in the drawing following deenergizing of the coil 41 or 42 is slightly less than the interval for which it was energized, thereby returning the belt shifting device to a position slightly in advance of its original location. This may be done in a manner well known in the art, namely, by providing suitably sized orifices in the dashpots, by providing one-way acting flexible pistons therefor, by adjusting the tension of the return springs thereof, etc. This means that for the cycle just mentioned the speed of pulley 10 would end up somewhat faster than pulley 9 relative to their original speeds thereby impressing a continuous correction to the speed of pulley 10 in order to minimize the possibility of recurrence of an abnormal change in the size of the loop.

Correction in the opposite direction is made when the loop 5 rises so that the upper beam from light source 17 illuminates photo-cell 19. Coil 24 of relay 22 is then energized which closes contact members 26 and 27 and opens contact members 28. Closing of contact members 26 energizes the coil of relay 37 which effects closure of contact members 35 causing the motor 15 to drive the belt shifting device 12 so as to reduce the speed of pulley 10 relative to pulley 9. Closing of contact member 27 energizes coil 42 of time delay relay 40 (which compresses spring 44) and raises piston 48. Opening of contact member 28 prevents the flow of current through contact members 46 of time delay relay 40. When loop 5 is lowered a sufficient amount to again interrupt the upper light beam, coil 24 will be deenergized thereby closing contact members 28 and completing the circuit through these contact members and contact members 46 of time delay relay 40 thereby energizing the coil of relay 38. This will then reverse motor 15 to operate the belt shifting device 12 to shift the belt back toward its original position. The timing of relay 40 is exactly as previously described so that the belt shifting device 12 will return nearly to its original position.

The design of devices 9, 10, 11, 12, 13, 14 and 15 are purposely such as to produce a rapid change in speed of rolls 3 relative to rolls 2 in response to the operation of the relays as just described. This scheme of control corrects the position of the loop as quickly as possible, but the rapid change in speed is immediately followed by a return to a given base speed close to the value preceding a correction. In this case the method of obtaining anti-hunting is to return the belt nearly to its original position. Furthermore, it can be seen that this anti-hunting force is proportional to the degree of correction necessary since the greater the difference in speed of rolls 3 and rolls 2, the longer will be the interval of time necessary to return the loop 5 within the zone between the upper and lower light beams, also the longer will be the interval of time the anti-hunting force will remain in effect.

I am, of course, aware that others, particularly after having had the benefit of the teachings of my invention, may devise other devices embodying my invention, and I therefore, do not wish to be limited to the specific showings made in the drawing and the descriptive disclosure hereinbefore made, but wish to be limited only by the scope of the appended claims and such prior art that may be pertinent.

I claim as my invention:

1. In a device for conveying a strip of material including a pair of rolls, means for driving said rolls including variable speed transmission means for driving said rolls at selective relative speeds, control means for controlling said speed transmission means, and changing the relative speeds of said rolls in order to provide a substantially constant length loop of material between said rolls, said control means including time delay means including a mechanical dashpot and including contact members having time constants which are directly proportional to the abnormality in length of said loop irrespective of the degree of such abnormality.

2. In a device for conveying a strip of material including a pair of rolls, variable speed driving means for driving said rolls at selectively different speeds, control means for controlling said variable speed driving means and the relative speeds of said rolls, said control means being responsive to the length of a loop of material between said rolls and including time delay contact members for completing an energizing circuit through said control means for a predetermined period of time as the result of an abnormal length of said loop of material, control means including contact members and being actuable in one direction in response to an abnormal change in length of said loop material for effecting a temporary correction in said relative speeds of said rolls, said control means also including time delay means making said control means actuable in an opposite direction to restore said relative speeds to substantially its initial value, means for rendering the time element for actuating said contact members in said opposite direction directly proportional to the abnormality in length of said loop of material irrespective of the degree of such abnormality.

3. In a device for conveying a strip of material including a pair of rolls, variable speed driving means for driving said rolls at selectively different speeds for providing a loop of said material therebetween, including a pair of oppositely converging, substantially cone-shaped members arranged side by side, each being in driving engagement with one of said rolls, a belt which couples both of said cone-shaped members, and speed controlling means for moving said belt along the surfaces of said cone-shaped members to change the relative speeds of said rolls in response to change in size of said loop of material from a predetermined optimum size, said speed control means including contact members which are actuable in one direction for a predetermined period of time for effecting movement of said belt to change the relative speeds of said rolls, said speed control means also including time delay means making said speed control means actuable in an opposite direction for a period of time which is proportional to the abnormality in size of said loop irrespective of the degree of such abnormality for effecting return of said belt to substantially its original position to restore the relative speeds of said rolls to substantially their original value.

4. In a device for conveying a strip of material including a pair of rolls, variable speed driving means for driving said rolls at selectively different speeds for providing a loop of said material therebetween, including a pair of oppositely converging, substantially cone-shaped members arranged side by side, each being in driving engagement with one of said rolls, a belt which couples both of said cone-shaped members, a pair of switching means, a pair of time delay relays, motor means rotatable in either of two directions for moving said belt along the surfaces of said cone-shaped members, one of said switching means being responsive to an excessive length of said loop of material to effect rotation of said motor means in one direction so as to cause movement of said belt in one direction along the surfaces of said cone-shaped members to correct said abnormality, the other of said switching means being responsive to abnormal insufficient length of said loop material to effect rotation of said motor means in an opposite direction so as to cause movement of said belt in an opposite direction to correct said abnormality, each of said time delay relays being actuable by return of said loop material to substantially normal position to return said belt substantially to its initial position, each of said time delay relays having a time constant for said return actuation only, which is proportional to the degree of abnormality of said loop material.

5. In a device for conveying a strip of material including a pair of rolls, variable speed driving means for driving said rolls at selectively different speeds, control means for controlling said variable speed driving means and the relative speeds of said rolls, said control means being responsive in one direction to the size of a loop of material between said rolls and being effective to complete a circuit for a predetermined period of time as the result of and in proportion to the change in size of said loop from a predetermined optimum size irrespective of the degree of abnormality to change the relative speeds of said rolls to restore said loop to substantially normal size, said control means including time delay means and being actuable with time delay in an opposite direction for a period of time which is substantially equal to the period required to restore the loop to substantially normal size to restore said relative speeds of said rolls to substantially their initial values.

6. In a device for conveying a strip of material including a pair of rolls, variable speed driving means for driving said rolls at selectively different speeds, control means for controlling said variable speed driving means and the relative speeds of said rolls, said control means being responsive in one direction to the size of a loop of material between said rolls and being effective to complete a circuit for a predetermined period of time as the result of and in proportion to the change in size of said loop from a predetermined optimum size to change the relative speeds of said rolls to restore said loop to substantially normal size, said control means including time delay means and being actuable in an opposite direction with time delay for a period of time which is slightly less than the period required to restore the loop to substantially normal size irrespective of the degree of abnormality to restore said relative speed of said rolls slightly short of their normal values thereby impressing a continuous correction to said relative speeds of said rolls.

7. In a device for conveying a strip of material including a pair of rolls, variable speed driving means for driving said rolls at selectively different speeds, control means for controlling said variable speed driving means and the relative speeds of said rolls, said control means being responsive in one direction to the size of a loop of material between said rolls and being effective to complete a circuit for a predetermined period of time as the result of and in proportion to the change in size of said loop from a predetermined optimum size to change the relative speeds of said rolls to restore said loop to substantially normal size and during such restoration period to continuously move the plunger of said dashpot in a direction to compress said spring, said control means including a dashpot having a spring mounted contact member on its stem and being actuable in an opposite direction by said spring with time delay for a period of time which is substantially equal to the period required to restore the loop to substantially normal size by virtue of the resistance offered by said dashpot plunger in said opposite direction, thereby effecting a control function through said time delay contact members for restoring said relative speeds of said rolls to substantially their initial values.

8. In a device for conveying a strip of material, means for providing a substantially constant length of loop in a portion of said material, said means including an electro-mechanical speed control means actuable in response to an abnormal change in the length of said loop to effect correction thereof and electro-mechanical time delay means including contact members for substantially nullifying the effect of said speed control means and which are continuously operable during a time period which is substantially proportional to the abnormality of said loop irrespective of the degree of abnormality of said loop.

9. In a device for conveying a strip of material, means for providing a substantially constant length of loop in a portion of said material, said means including an electro-mechanical speed control means actuable in response to an abnormal change in the length of said loop to effect correction thereof and electro-mechanical time delay means including contact members for effecting partial nullification of said correction, said time delay contact members being continuously operable during a time period which is slightly less than that during which said correction was made irrespective of the degree of abnormality of said loop thereby imposing a small permanent correction to said loop.

10. In a device for conveying a strip of material, a variable speed drive for a part of said conveyor for varying the length of a loop in a portion of said material, means responsive to an abnormality in size of said loop from an optimum value for controlling the speed of said variable speed drive to effect correction of said abnormality, time delay means including contact members for controlling restoration of said drive to substantially its initial value after said correction has been made, said time delay contact members being continuously operable for a period which is substantially equal to the period during which said correction took place irrespective of the degree of abnormality of said loop.

WALDEMAR I. BENDZ.